United States Patent [19]

Sloan

[11] 4,268,787

[45] May 19, 1981

[54] ELECTRONIC CONTROL FOR SWITCHING VARIABLE SPEED/VARIABLE VOLTAGE ELECTRIC GENERATOR

[76] Inventor: Albert H. Sloan, 4200 Kean Rd., Fort Lauderdale, Fla. 33314

[21] Appl. No.: 52,004

[22] Filed: Jun. 25, 1979

[51] Int. Cl.[3] .......................... B62D 63/04; H02J 1/00; H02J 3/00

[52] U.S. Cl. .................................... 322/8; 307/10 R; 361/21; 322/94

[58] Field of Search .......................... 322/7, 8, 94, 11; 307/10 R, 39; 361/20, 21, 90, 91, 92

[56] References Cited

U.S. PATENT DOCUMENTS

| | | | |
|---|---|---|---|
| 3,475,061 | 10/1969 | Steinkamp et al. | 320/40 X |
| 3,585,483 | 6/1971 | Kawai | 307/10 R X |
| 3,868,559 | 2/1975 | Hill et al. | 322/8 X |
| 4,088,940 | 5/1978 | Ciarniello et al. | 322/8 |
| 4,121,146 | 10/1978 | Hill | 320/48 |

Primary Examiner—Robert J. Hickey

Attorney, Agent, or Firm—James E. Nilles

[57] ABSTRACT

An adjustable speed propulsion engine for a boat also drives an electric generator which supplies electric power to an electric load circuit on the boat. A solid state electronic control circuit senses when generator voltage departs from a voltage "window" or range defined by preselected low and high voltages (as a result of a departure in engine speed from a cruise speed range to some lower or high speed) and operates a contactor to disconnect the generator from the load circuit to prevent low or high voltage damage to electrical equipment on board. The electronic control circuit operates the contactor to reconnect the generator to the load circuit only when generator voltage rises to a preselected initial turn-on voltage which is above the preselected low voltage but below the normal rated voltage of the generator. The electronic control circuit includes time delay means to prevent a transient low voltage condition ("flicker") from causing disconnection of the generator from the load circuit.

10 Claims, 1 Drawing Figure

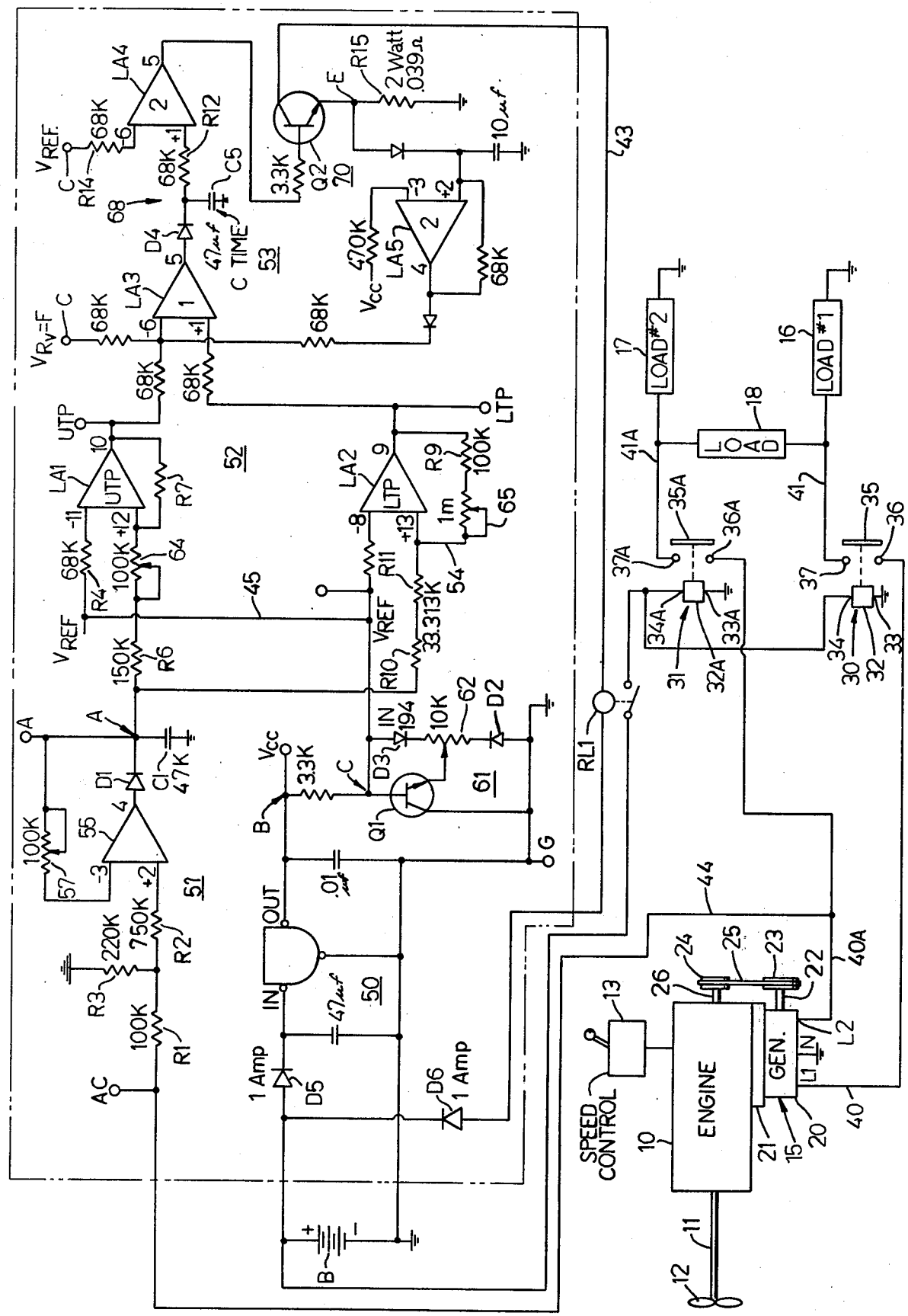

ELECTRONIC CONTROL FOR SWITCHING VARIABLE SPEED/VARIABLE VOLTAGE ELECTRIC GENERATOR

BACKGROUND OF THE INVENTION

1. Field of Use

This invention relates generally to electronic control circuits for electric generators. In particular it relates such control circuit which connect and disconnect a generator to and from a load circuit in response to generator output voltage (or frequency) levels.

2. Description of the Prior Art

Many boats, such as small fishing vessels, cabin cruisers and some sailboats, use a gasoline or diesel powered adjustable speed internal combustion engine for propulsion and necessary speed changes of the boat are accomplished by changing the speed of the engine. As a practical matter, however, when the boat is underway, it and the engine are usually operated in a so-called "cruise speed" range for about 90% of the time. The electric power required to operate electrical equipment aboard such boats (i.e., lights, electronic and radio gear, refrigeration equipment, motors for pumps and winches, etc.) is usually supplied from a d.c. or a.c. (60 Hz, single phase) generator which, when driven at rated speed, provides a rated output voltage of 110 (or 220) volts, Usually it is more economical and conservative of space to use the boat propulsion engine to drive the generator than to use a separate smaller auxiliary engine. Depending on the particular installation, the generator can be coupled directly to a PTO shaft on the engine or connected thereto by a gear-type or V-belt drive. The drive components are, of course, selected and matched so that when the engine is being operated in the "cruise speed" range, the generator is driven at its rated speed range or thereabout and delivers rated voltage or thereabout. As a result of such arrangements, however, changes in engine speed result in corresponding changes in generator speed. As long as the engine is operated at in cruise speed range, generator output voltage is sufficient to meet normal laod requirements. However, if engine speed decreases or increases relative to the cruise spped range, generator output voltage (and frequency, if a.c.) correspondingly increases or decreases an may drop below minimum or exceed maximum levels. Since such low voltage or high voltage levels could cause damage to electrical equipment supplied by the generator, most on-board electrical systems include a manually operable generator disconnect switch whereby the generator can be temporarily disconnected from the electrical load before any change in engine cruise speed is carried out. Occasionally, however, the boat operator fails to or forgets to operate the disconnect switch at the appropriate time with the result that the engine speed change and a high or low voltage condition damages electrical equipment.

SUMMARY OF THE INVENTION

The present invention is specially well-adapted for use with an adjustable speed propulsion engine for a boat which also drives an electric generator (i.e., rated at 110-120 volts, for example) which supplies electric power to an electric load circuit on the boat. Such engine is provided with operator actuated engine speed control means to enable engine speed changes required for navigation purposes. A solid state electronic control circuit in accordance with the invention senses when the generator rated speed (i.e., 3593 rpm) changes and generator voltage departs from a voltage "window" or range defined by preselected low (i.e., 90 volts) and high (i.e., 135 volts) voltages (as a result of a departure in engine speed from a cruise speed range (i.e., about 1450 rmp) to some lower or high speed) and operates a contactor to disconnect the generator from the load circuit to prevent low or high voltage damage to electrical equipment on board. The electronic control circuit operates the contactor to reconnect the generator to the load circuit only when generator voltage rises to a preselected initial turn-on voltage (i.e., 112 volts) which is above the preselected low voltage but below the normal rated voltage of the generator. The electronic control circuit includes time delay means (i.e., about 3 seconds) to prevent a transient low voltage condition ("flicker") below 90 volts, for example, from causing disconnection of the generator from the load circuit.

The electric generator, which is driven by the engine and responsive to changes in engine speed, has power output terminals for supplying the electric load circuit, and is adapted to provide a predetermined voltage (and predetermined frequency, if an a.c. generator) across its output terminals when the engine is operating within the aforesaid cruise speed range. The electrical contactor is operable for connecting and disconnecting the power output terminals of the generator to and from the load circuit. The electronic control circuit in accordance with the invention is responsive to electrical conditions (such as voltage or frequency) at the generator terminals to operate the the electrical contactor to connect or disconnect the generator and the load.

The electronic control circuit, which includes solid state devices, senses a low voltage and a high voltage level at which it causes the contactor to open and disconnect the load circuit. The low and high voltage levels are arbitrarily selected to suit load requirements and are preset by the operator of the system. The low and high levels define a voltage "window" within which the contactor maintains the generator connected to supply the load. The low and high levels each span a small voltage range. In a typical 120 volt system, for example, the low level might be in the range of 90 to 95 volts and the high level might be in the range of 135 to 140 volts.

The electronic control circuit further includes means to reduce the problems associated with connecting the generator to relatively high loads. Thus, the electronic control circuit also includes means whereby an arbitrarily chosen presettable initial turn-on voltage level must be reached before the contactor is actuated to connect the generator to the load. For example, in a 120 volt electrical system having a "window" defined by a 90-95 volt and 135-140 volt parameter, the initial turn-on level might be 112 volts, or any other selected voltage within the "window".

The electronic circuit also includes time delay means to prevent a transient low voltage condition (flicker) from causing disconnection of the generator. The problem of voltage surge or voltage drop is commonly known as "flicker". Since a boat generator of relatively small size is being driven, compared to the electrical starting loads imposed by machinery on a boat, when a heavy piece of electrical machinery does come on the line, it causes a flicker. Flicker is a momentary voltage drop which in many instances is so fast that the boat ammeter won't even read it, but which of course can be seen when the lights blink. Flicker has to be accounted for in the present control system because, since voltage is being sensed, a momentary voltage drop will cause drop-out. If this happens, the voltage would go low, the generator would disconnect, and then everything would try to re-start up again as the generator is reconnected and when the voltage immediately comes back up in a few milliseconds. In early tests, it was found necessary to design a system to get rid of flicker and this has been accomplished.

The electronic control circuit generally requires or comprises a power supply such as a battery; a power supply regulator for the battery; a voltage (frequency) sensing circuit for connection to the generator terminals and for providing a corresponding or analogous low voltage d.c. control signal; low voltage and high voltage detection circuits for receiving the control signal and for ascertaining the voltage level; a logic circuit responsive to the detection circuits for controlling a transistor which, in turn controls energization of the contactor which controls connection of the generator to the load.

An electronic control system in accordance with the invention affords several advantages over the prior art. For example, it eliminates the need for a manually operable disconnect switch whose actuation, when required, may be overlooked. It provides a low cost, relatively simple and fool-proof means for automatically disconnecting the generator from the load when predetermined high or low voltage levels are reached as a result of a change in engine speed from a cruise range. It provides an initial turn-on voltage for the generator which is above the low voltage level drop-out voltage but enables the generator to remain connected to the load if voltage subsequently fails below the initial turn-on level. It provides means to prevent low-voltage flicker from disconnecting the generator.

Other objects and advantages of the invention will hereinafter appear.

THE DRAWING

The single FIGURE in the drawing is a schematic diagram of a typical small boat electrical system and an electrical circuit diagram of an electronic control circuit in accordance with the invention.

DESCRIPTION OF A PREFERRED EMBODIMENT

Referring to the single FIGURE of the drawing, the numeral 10 designates a variable speed internal combustion engine such as is used aboard a boat for propulsion purposes. Engine 10 is connected by a propeller shaft 11 to drive a propeller 12. An operator actuatable engine speed control 13 is connected to engine 10 to enable the engine to run at a cruise speed range and at speeds above and below the cruise speed range. Engine 10 is connected to drive an electrical generator 15 for supplying electrical power to electrical load circuits 16, 17 and 18 which comprise electrical apparatus used aboard the boat. Generator 15 comprises a stator housing 20 which is rigidly mounted alongside or on engine 10 by means of a mounting bracket 21 and further comprises a rotor (not shown) having a rotor shaft 22. Rotor shaft 22 has a driven pulley 23 rigidly secured thereon and the rotor shaft 22 is driven by an endless flexible drive belt 25 which is disposed around driver pulley 23 and a drive pulley 24 which is rigidly secured on a rotatable power take-off shaft 26 of engine 10. As will be understood, the pulleys 23 and 24 are of such a size that when engine 10 is operating within a predetermined range, the generator 15 is driven at a corresponding speed range which is sufficient to cause the generator to produce a predetermined rated voltage (and rated frequency, if generator 15 is an a.c. generator). Operation of engine 10 above or below cruise speed range effects a corresponding increase or decrease in the rotational speed of generator 15 and a corresponding increase or decrease in generator output voltage (or frequency).

It is to be assumed that generator 15 is a single phase alternating current generator rated at 220 volts a.c., 60 Hz. Generator 15 comprises power output terminals designated N (neutral), L1 and L2. Voltage across terminals L1 and L2 is 220 volts and voltage across terminals L1 and N or L2 and N is 120 volts.

A pair of electrical contactors designated 30 and 31 are provided for connecting and disconnecting the generator terminals L1 and L2 to the load circuits 16, 17 and 18. Since the contactors 30 and 31 are identical, only contactor 30 is hereinafter described in detail. Contactor 30 comprises a solenoid or operating coil 32 having a pair of terminals 33 and 34 and also comprises a normally open spring biased contact or switch 35 which makes or breaks contact between the terminals 36 and 37. Main terminal 36 of contactor 30 is connected to generator output terminal L1 by a conductor wire 40 and main terminal 37 is connected by a conductor wire 41 to one side of the load circuits 16 and 18. Main terminal 36A of contactor 31 is connected to generator output terminal L2 by a conductor wire 40A and main terminal 37A is connected by a conductor wire 41A to one side of the load circuit 17 and to the other side of load circuit 18. The operating coil terminals 33 and 33A of the contactors 30 and 31, respectively, are each connected to ground. The operating coil terminals 34 and 34A of the contactors 30 and 31, respectively, are each connected by an electrical conductor wire 43 to a relay RL1 which is operated by the emitter circuit of a power transistor Q1 which is part of the electronic control circuit hereinafter described. When the operating coils 32 and 32A of the contactors 30 and 31, respectively, are deenergized, the contacts 35 and 35A, respectively, are open and disconnect generator 15 from the load circuits. Conversely, when the coils 32 and 32A are energized (from a battery B, as hereinafter appears), the contactors 35 and 35A close to connect the generator 15 to the load circuits. Each contactor 30, 31 may, for example, take the form of a Model No. 14059, 12 volt, continuous duty starting relay manufactured by Cole-Hersee of Boston, Mass.

Generally considered, the electronic control system in accordance with the invention comprises a power supply circuit 50, including a battery B, a generator output voltage (or frequency) detector circuit 51, a voltage (frequency) comparator circuit 52, and a buffer and driver circuit 53.

Detector circuit 51 senses the a.c. generator output voltage at terminal L2 through an amplifier 55 which is an a.c. active attenuator with a d.c. output and takes the form of an Archer Type LM 3900 operational amplifier. The a.c. signal voltage is received in raw form from conductor 44 and a voltage divider comprising resistors R1, R2, R3 lowers it somewhat before it is fed into amplifier 55. The output voltage of amplifier 55 is d.c. and is adjusted by means of a trim potentiometer 57. At point A, for example, 120 volts a.c. "in" to resistor R1 equals 6 volts d.c. "out". A capacitor C1 filters the output of amplifier 55 also and makes it stable. A diode D1 allows passage of only the positive half of a sine wave as the output. The 6 volt d.c. output signal at point A is fed into comparator circuit 52. Unlike other comparator circuits, it has been found most advantageous to use non-inverting logic, although most comparators are made with one comparator inverting and the other non-inverting; usually, the lower comparator being an inverting comparator and the upper comparator being a non-inverting comparator. In the embodiment herein disclosed, and as hereinafter described, the comparators or amplifiers 55, LA1, LA2 and LA3 are embodied in a single solid state device, such as an Archer Type LM 3900 integrated circuit. The comparators or amplifiers LA4 and LA5 are embodied in a separate type LM 3900 integrated circuit device.

All of the comparators LA1, LA2, LA3, LA4, LA5 and attenuator 55 are driven by power supply circuit 50 which includes a voltage regulator circuit 61 which has an output of 8 volts nominal at point B. The reference voltage is provided through a voltage reference transistor Q1, as shown, which has a 2.49 volt output at point C, for example, and it is highly stable to within one millivolt per degree centigrade. The output reference voltage at point C is adjusted through a trim potentiometer 62 which is in circuit with diodes D2 and D3. Once set, trim potentiometer 62 does not have to be readjusted. The reference voltage is fed to the comparator circuit 52 by conductor wire 45.

The input signal voltage from the detector circuit 51 at point A is also fed to the comparator circuit 52. An upper trip point signal from point C results from a synchronous system. The upper trip point signal at point C is fed through a 68 K resistor R4 to the negative input terminal 11 of a comparator or amplifier LA1 to initially hold the upper trip point of comparator LA1 off. A 150 K resistor R6 and 100 K trim potentiometer 64 are provided in circuit with point A to enable setting of the upper or high trip point voltage. A hysterisis resistor R7 of 4.7 to 10 megohms is placed in a positive feedback loop between terminals 10 and 12 of comparator LA1 to insure positive turn on with a good solid switching action. A low trip point voltage signal from point C is similarly fed to terminal 8 of a comparator or amplifier LA2, but the adjustment thereof is done in a hysterisis loop 54 including resistor R9 and potentiometer 65.

The low voltage input circuit is unusual. The two resistors R10 and R11 that are connected in series to point A determine the initial turn on voltage level. For example, resistors R10 and R11, if totalling 33.3 K, would give a 110 volt turn on level. Once comparator LA1 is turned on, positive feedback loop 54 enables a voltage drop back down to (just above) 90 or 95 volts, for example. The low voltage drop out point is adjusted or set by the one megohm trim potentiometer 65.

The output logic signals of the two comparators LA1 and LA2 are fed into a buffer comparator LA3 which sums the logic of the two input signals at its input terminals 6 and 1. When the low voltage trip point is reached or turned on, it turns on the comparator LA3 which is part of the logic buffer and a driver circuit 53. When comparator LA3 is turned on, it signifies that the generator output voltage is above 95 volts (after initial turn on). When the upper trip point generator voltage level (i.e., 135-140 volts) is reached, it reinforces the off logic terminal of the comparator LA3, thus turning off comparator LA3.

The output signal at terminal 5 of comparator LA3 is fed through a diode D4, associated with a 47 mf capacitor C5 and 68 K resistor R12 defining a time delay circuit 68, into a comparator LA4 which is embodied in a separate type LM 3900 integrated circuit device. The separate device for comparator LA4 is used to form a high input resistance buffer which will not load the timing capacitor C5 excessively to the point that is desired for use as a time constant. Comparator LA4 is initially held off by a reference voltage impressed thereon (from point C) through a 68 K resistor R14. As the comparator LA4 turns on, the output thereof at terminal 5 is latched on. Timing capacitor C5 charges quickly through the diode D4 to give fast turn on. However, when the circuit turns off, the diode D4 blocks the discharge of the timing capacitor C5. The capacitor C5 discharges through timing resistor R12 into the non-inverting summing point terminal 1 of amplifier LA4. A three second delay is required for the voltage at terminal 1 of comparator LA4 to drop below the reference voltage at terminal 6 of comparator LA4 and, therefore, comparator LA4 will not turn off for three seconds. Thus, there is provided a hysteresis loop needed to ignore a momentary voltage drop associated with "flicker" as hereinbefore discussed. The time constant can be adjusted in the field by changing the value of resistor R12. However, tests show that a three second delay is usually adequate. A larger value resistor R12 provides a longer delay, whereas a smaller value resistor R12 gives a shorter delay.

It should be noted, for example, that any motor that is properly loaded with normally start in three seconds. If the motor does not come up to full voltage in three seconds, this in itself indicates there is a problem, and the present system will shut down, thereby providing a form of low voltage protection for the electric motor.

The output of comparator LA4 is used to drive or control the output transistor Q2. The output transistor Q2, in turn, drives or controls relay RL1 which turns the contactors 30 and 31 on and off to control the connection and disconnection of generator 15.

A protective or electronic fuse circuit 70 is incorporated in the system. Thus, 2 watt, 0.30 ohms output resistor R15 is connected between the emitter-collector circuit of transistor Q2 and ground. As the voltage at point E increases and is sensed as greater than one volt, for example, an electronic fuse comparator or amplifier LA5 turns on and this, in turn, effects current flow to terminal 6 of logic buffer LA3, shutting down the system. Once shut down, the time delay circuit 68 is still operative and will require a three second delay before the system can be deenergized and the contactors 30 and 31 opened.

Since integrated circuit devices are highly susceptible to polarity reversal and can immediately fail, the power input to them from battery B is connected through a diode D5 and a clamping diode or free-wheeling diode D6 is connected to the relay coil RL1 to keep the voltage in the line from affecting the emitter-collector circuit of transistor Q2.

The electronic control circuit hereinbefore described operates as follows. During start-up of engine 10 and generator 15, as the voltage at generator terminal L2 increases and reaches the level referred to as the "initial turn-on voltage" (arbitrarily set, for example, at 112 volts during manufacture), the comparator LA2 senses this voltage and causes the relay RL1 and contactors 30 and 31 to close. This arrangement insures proper starting, as it would be imprudent to try to energize the load circuits 16, 17 and 18 at 90 to 95 volts, which is the low voltage end of the "window". To insure positive starting, the initial turn-on voltage must be well above the low voltage drop out level. If the boat operator plans to cruise at engine speeds which result in generator speeds below the initial turn on point, he must momentarily accelerate the engine 10 by means of control 13 so that generator voltage momentarily exceeds the initial turn on voltage in order to cause turn on or closure of the contactors 30 and 31. It is then possible to reduce the throttle control 13 to an engine speed that results in a generator voltage above the low voltage level of the "window", i.e., 90 to 95 volts. The low voltage level is adjustable in the field. The top end of the "window" is also adjustable in the field by means of potentiometer 65. The hysterisis for the 135 volt level is much smaller than for the low voltage end of the window and is also adjustable by means of potentiometer 64. Tests show that 2 to 3 volts hysteresis works well, i.e., providing a 135 volt turn-off voltage, 133 volts to turn back on, and going back to 135 volts before turning off again.

As long as engine 10 and generator 15 are operated in the cruise range and generator voltage comes within the range of 90 to 95 volts and 135 volts, voltage fluctuations are ignored and the contactors 30 and 31 remain closed thereby keeping the generator connected to the loads 16, 17 and 18. However, if engine and generator speed fall below or rise above the cruise speed range, as a result of operator manipulation of speed control 13, low voltage or high voltage conditions are sensed, as the case may be, and the contactors 30 and 31 open to disconnect the generator 15 from the loads 16, 17 and 18. The contactors 30 and 31 do not reclose until engine and generator speeds are increased sufficiently to provide the initial turn-on voltage at the generator terminals.

The generator voltage drop due to the load demand upon starting normally causes the problems. For example, the full-load amperage surge on starting would probably be about 3 amps for a type of refrigerator commonly used on a boat, with the locked rotor amperage surge being about 15 amps or five times full-load amperage. Thus, the initial on-cycle of the refrigerator causes a great in-rush which in turn drops the voltage. The present electronic control circuit sees this voltage drop and opens the contactors 30 and 31. As soon as the generator 15 is disconnected, the voltage would again increase and the contactors 30 and 31 would, unless otherwise prevented, then reclose and try to energize the system under full load. This would create an oscillation problem. To counteract this problem, applicant provides the time delay circuit 68 which affords a three second time delay which is uniform across the "window". In the circuit of the present invention the amplifier LA5 is connected in such a manner that it ignores the input voltage value from generator terminal L2 and gives a constant time delay across the entire "window".

In the embodiment of the invention disclosed herein, the changes in magnitude of power output resulting from changes in rotational speed of generator 15 are detected by sensing, measuring, and computing the output voltages of the generator. It is to be understood however, that generator 15 is an alternating current generator and accordingly would exhibit changes in frequency, as well as changes in voltage, as a result of changes in rotational speed. Accordingly, the electronic control circuit described herein and which is designed to be responsive to generator output voltage, could be modified so as to be responsive to frequency changes instead of voltage changes. Such modification would involve adaptation and modification of detector circuit 51 so that it is responsive to frequency instead of voltage at generator terminal L2, but provides a low voltage d.c. signal at its output which is proportional to frequency instead of voltage.

We claim:

1. In combination:
an electrical generator which exhibits changes in magnitude of electrical power output in response to changes in rotational speed;
an electrical load to be supplied with power solely by said generator;
and electronic control means responsive to changes in generator power output magnitude to connect or disconnect said generator and said load and comprising:
means responsive to occurrence of power output of a predetermined magnitude within a predetermined range of magnitude to connect said generator and said load;
means responsive to any power output magnitude within said range after said occurrence of said power output of predetermined magnitude to maintain said generator and said load connected;
means responsive to occurrence of power output of a magnitude above said range to disconnect said generator and said load;
and means responsive to occurrence for a predetermined interval of time of power output of a magnitude below said range to disconnect said generator and said load.

2. In combination:
an electrical generator which exhibits changes in output voltage in response to changes in rotational speed;
an electrical load to be supplied solely by said generator;
and electronic control means responsive to generator output voltage to connect or disconnect said generator and said load and comprising:
means responsive to occurrence of a predetermined output voltage within a predetermined voltage range to connect said generator and said load supplied solely from said generator;
means responsive to any output voltage within said voltage range after occurrence of said predetermined output voltage to maintain said generator and said load connection;
means responsive to occurrence of an output voltage above said voltage range to disconnect said generator and said load;
and means responsive to occurrence for a predetermined interval of time of an output voltage below said voltage range to disconnect said generator and said load.

3. In an electronic control circuit for use with an electrical generator which exhibits changes in output voltage proportional to changes in its rotational speed, said electronic control circuit being responsive to generator voltage to operate a relay operable to effect connection and disconnection of said generator and a load:
first means for sensing generator output voltage and for providing an input signal proportional thereto;
second means for receiving said input signal, for determining the magnitude thereof, and for providing an output signal if said input signal is outside of a voltage range defined by a predetermined low voltage and a predetermined high voltage, said second means including time delay means to prevent the occurrence of said output signal unless said input signal is at or below said predetermined low voltage for a predetermined interval of time;

said second means further including feed-back means to enable occurrence of said output signal until said input signal increases to a predetermined voltage within said voltage range;

and third means including a relay control transistor responsive to the occurrence of said output signal to effect a disconnecting operation of said relay and further responsive to absence of said output signal to effect a connecting operation of said relay.

4. In an electronic control circuit for use with an electrical generator which exhibits changes in output voltage proportional to changes in its rotational speed, said electronic control circuit being responsive to generator voltage to operate a relay operable to effect connection and disconnection of said generator and a load:

first means including a first operational amplifier for sensing generator output voltage and for providing an input signal proportional thereto;

second means including second, third and fourth operational amplifiers for receiving said input signal, for determining the magnitude thereof, and for providing an output signal from said fourth operational amplifier if said second and third operational amplifiers sense that said input signal is outside of a voltage range defined by a predetermined low voltage and a predetermined high voltage, said second means including time delay means connected to said fourth operational amplifier to prevent the occurrence of said output signal unless said input signal is at or below said predetermined low voltage for a predetermined interval of time;

said second means further including feed-back means connected to at least one of said second and third operational amplifiers to enable occurrence of said output signal until said input signal increases to a predetermined voltage within said voltage range;

and third means including a fifth operational amplifier for receiving said output signal and a relay control transistor controlled thereby and responsive to the occurrence of said output signal to effect a disconnecting operation of said relay and further responsive to absence of said output signal to effect a connecting operation of said relay.

5. In a motor-generator system:
a variable speed engine operable at speeds above, below or within a predetermined speed range;
speed control means for operating said engine at a selected one of said speeds;
an electrical generator driven by said engine and which exhibits changes in output voltage in response to changes in its rotational speed caused by changes in engine speed;
an electrical load to be supplied solely by said generator;
and electronic control means responsive to generator output voltage to connect or disconnect said generator and said load and comprising:
means responsive to occurrence of a predetermined initial start-up output voltage within a predetermined voltage range to connect said generator and said load;
means responsive to any output voltage within said voltage range after occurrence of said initial start-up voltage to maintain said generator and said load connection;
and means responsive to occurrence of an output voltage outside of said voltage range to disconnect said generator and said load.

6. A motor-generator system according to claim 5 wherein said electronic control means further includes timing means to prevent disconnection of said generator and said load in response to occurrence of an output voltage below said voltage range unless said low voltage occurrence persists for a predetermined interval of time.

7. In a motor-generator system:
a variable speed engine operable at speeds above, below or within a predetermined speed range;
speed control means for operating said engine at a selected one of said speeds;
an electrical generator driven by said engine and which exhibits changes in output voltage in response to changes in its rotational speed caused by changes in engine speed, said generator adapted to provide a voltage within a predetermined voltage range when said engine is operating within its said predetermined speed range;
an electrical load to be supplied solely by said generator;
and electronic control means responsive to generator output voltage to connect or disconnect said generator and said load and comprising:
means responsive to occurrence of a predetermined initial turn-on output voltage within said voltage range to connect said generator and said load;
means responsive to any output voltage within said voltage range after occurrence of said initial turn-on voltage to maintain said generator and said load connected;
and means responsive to occurrence of an output voltage outside of said voltage range to disconnect said generator and said load.

8. A motor-generator system according to claim 7 wherein said electronic control means further includes timing means to prevent disconnection of said generator and said load in response to occurrence of an output voltage below said voltage range unless said low voltage occurrence persists for a predetermined interval of time.

9. In a motor-generator system:
a variable speed engine operable at speeds above, below or within a predetermined speed range;
speed control means for operating said engine at a selected one of said speeds;
an electrical generator driven by said engine and which exhibits changes in output voltage in response to changes in its rotational speed caused by changes in engine speed, said generator adapted to provide a voltage within a predetermined voltage range when said engine is operating within its said predetermined speed range;
an electrical load to be supplied solely by said generator;
and electronic control means responsive to generator output voltage to connect or disconnect said generator and said load and comprising:
means responsive to occurrence of a predetermined initial turn-on output voltage within said voltage range to connect said generator and said load;

means responsive to any output voltage within said voltage range after occurrence of said initial turn-on voltage to maintain said generator and said load connected;

means responsive to occurrence of an output voltage above said voltage range to disconnect said generator and said load;

and means responsive to occurrence for a predetermined interval of time of an output voltage below said voltage range to disconnect said generator and said load.

10. In combination on board a boat:

an adjustable speed propulsion engine for said boat operable at speeds below, above and within a predetermined speed range;

operator controlled means for operating said engine at a selected one of said speeds;

a load circuit including electrical equipment on board said boat;

an electric generator driven by and responsive to the speed of said engine for supplying the sole electric power to said electric load circuit;

a contactor operable to connect and disconnect said generator and said load circuit;

and an electronic control circuit responsive to generator output voltage for operating said contactor and including:

means for sensing when generator voltage departs from a voltage range defined by preselected low and high voltages and for operating said contactor to disconnect said generator from said load circuit to prevent low or high voltage damage to said electrical equipment, said voltage departure resulting from a departure in engine speed from said cruise speed range to some lower or higher speed;

said electronic control circuit further including means to operate said contactor to reconnect said generator to said load circuit only when generator voltage rises to a preselected initial turn-on voltage which is above said preselected low voltage but below the normal rated voltage of said generator;

and said electronic control circuit also including time delay means to prevent a transient low voltage condition caused by said electrical equipment in said load circuit from causing operation of said contactor to disconnect said generator from said load circuit.

* * * * *